United States Patent
Zuili

(10) Patent No.: US 7,249,104 B2
(45) Date of Patent: Jul. 24, 2007

(54) PAY-PER-CLICK SYSTEM AND METHOD THAT DETERMINE WHETHER A REQUESTED LINK TO A MERCHANT WEBSITE IS LEGITIMATE OR FRAUDULENT

(75) Inventor: Patrick Zuili, Boca Raton, FL (US)

(73) Assignee: Brite Smart, LLC, Wilmington, DE (US)

( * ) Notice: Subject to any disclaimer, the term of this patent is extended or adjusted under 35 U.S.C. 154(b) by 790 days.

(21) Appl. No.: 10/360,688

(22) Filed: Feb. 7, 2003

(65) Prior Publication Data

US 2004/0158528 A1 Aug. 12, 2004

(51) Int. Cl.
*G06Q 99/00* (2006.01)
(52) U.S. Cl. ............................. 705/52; 707/9
(58) Field of Classification Search ............ 705/26–27, 705/52–54, 64–67, 75–78; 713/168–169; 707/9–10, 102–104; 726/1–5, 26–30
See application file for complete search history.

(56) References Cited

U.S. PATENT DOCUMENTS

| | | | | |
|---|---|---|---|---|
| 6,115,742 A | * | 9/2000 | Franklin et al. ............ 709/224 |
| 6,826,594 B1 | * | 11/2004 | Pettersen ..................... 709/203 |
| 2002/0052784 A1 | * | 5/2002 | Sherwin et al. ............... 705/14 |
| 2002/0066084 A1 | * | 5/2002 | Sobeski et al. ............. 717/137 |
| 2003/0014331 A1 | * | 1/2003 | Simons ........................ 705/27 |
| 2003/0216930 A1 | * | 11/2003 | Dunham et al. ............... 705/1 |
| 2003/0220835 A1 | * | 11/2003 | Barnes, Jr. ................... 705/14 |

OTHER PUBLICATIONS

Mulhall, "How Real a Threat Does Computer Crime Represent?", Aug. 1, 1996, Computer Fraud & Security Bulletin, ISSN: 0142-0496.*

* cited by examiner

*Primary Examiner*—Mary D. Cheung
(74) *Attorney, Agent, or Firm*—Joe Zheng

(57) ABSTRACT

This invention improves upon existing pay-per-click arrangements periodically generating a code associated with the search-engine users. This code, preferably in the form of a serial number, is compared to the user of the website, such that by observing a metric like the number of clicks for a given period of time, be it a short time or a longer period, such as a day or a week, the system can automatically determine if certain clicks are illegitimate. This allows the pay-per-click company to more fairly invoice the merchants, thereby preventing fraudulent over use.

16 Claims, 1 Drawing Sheet

PAY-PER-CLICK SYSTEM AND METHOD THAT DETERMINE WHETHER A REQUESTED LINK TO A MERCHANT WEBSITE IS LEGITIMATE OR FRAUDULENT

FIELD OF THE INVENTION

This invention relates generally to network computing of the type which occurs over the Internet, for example, and, more particularly, to a method of protecting the providers of pay-per-click services from multiple illegitimate usages.

BACKGROUND OF THE INVENTION

Over the last few years in particular, the capabilities of the Internet have grown dramatically, with the introduction of new protocols (i.e., XML), advanced browsers, electronic commerce capabilities, and other features.

Numerous commercial enterprises are now attempting to somehow profit through this new infrastructure, in many cases by providing services that attach a smaller incremental monetary value to a particular transaction.

One such type of capability is the pay-per-click search engine popularized by Google and other companies. In accordance with such a capability, a user goes to a website, and inputs the name of goods or services that they would like the pay-per-click company to find. Various providers of goods and services register their websites with the company, and these are provided to the user in a list which is prioritized by the level of compensation which the merchant will give the pay-per-click company if the user is routed to their site. For example, using such a system, if a user types in "binoculars," the pay-per-click system might return five potential links, with the most prominent one being associated with that supplier of binoculars which will compensate for a penny or a few cents more than the links presented below.

One problem with existing systems, is that a user may cause an undesirable level of expenditure on the part of the merchant by overclicking on a particular link. In some cases, it has been known that some users have done this simply for the purpose of undermining a particular provider or competitor. Since the existing systems have no way of knowing whether a link through is legitimate or bogus, the provider of the goods/services winds up having to pay the pay-per-click provider excess sums, with the fraudulent perpetrator remaining unreprimanded.

SUMMARY OF THE INVENTION

This invention improves upon existing pay-per-click arrangements periodically generating a code associated with the search-engine users. This code, preferably in the form of a serial number, is compared to the user of the website, such that by observing a metric like the number of clicks for a given period of time, be it a short time or a longer period, such as a day or a week, the system can automatically determine if certain clicks are illegitimate. This allows the pay-per-click company to more fairly invoice the merchants, thereby preventing fraudulent over use.

DETAILED DESCRIPTION OF THE INVENTION

Figure 1:
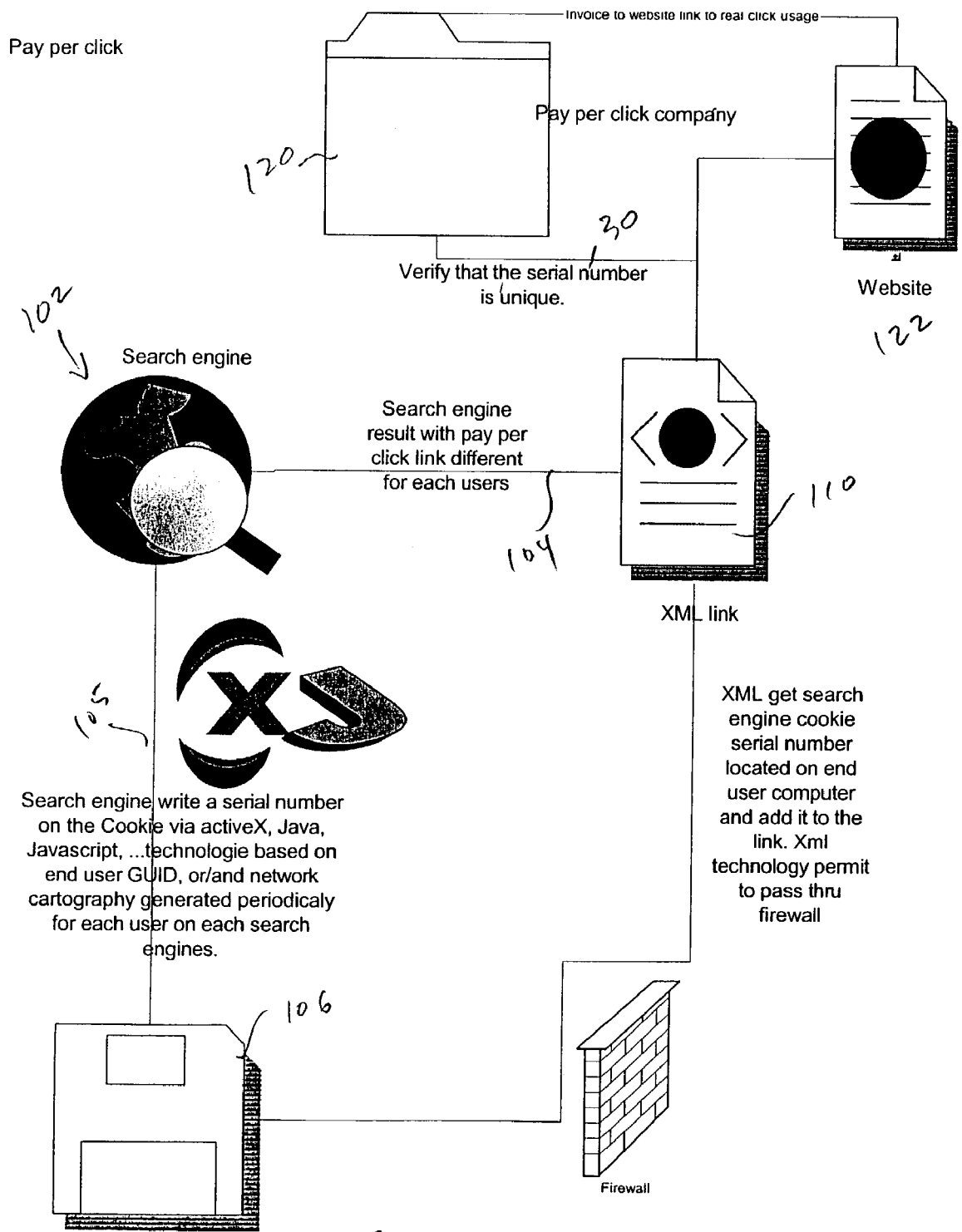
FIG. 1 is a diagram which illustrates a per-per-click system incorporating a preferred embodiment of the present invention.

Reference is made to FIG. 1 which illustrates a typical configuration associated with a pay-per-click implementation. It is noted that although the diagram includes certain interconnected graphical blocks, these are not take to mean "hardware" or "software," but may include any combination of hardware/software necessary to implement a particular function. In addition, although lines are drawn between the various components, this is not meant to imply that they are necessarily implemented in close proximity to one another, since in many cases these capabilities will be remote.

The search engine 102 provides a result along path 104 which is indicative of a link associated with different users. Engine 102 may be any existing or yet-to-be-developed system, including findwhat.com, google add words, overture, looksmart.com, kanoodle.com, and so forth.

In addition to the result generated along path 104, according to this invention, the search engine generates a code, preferably in the form of a serial number utilizing a cookie via active X, Java, Javascript, or any other type of technology based upon the end-user's Global Unique Identifier (GUID). In addition, or as an alterative, network cartography may be generated periodically for each user based upon their use of the search engine 102.

Although the encoded serial number is shown being written to a floppy disk 106, again, it will be appreciated by those of skill in the art that any type of storage capability, such as a splash memory, and so forth may alternatively be utilized. The code (e.g., a serial number) generated by the search engine along path 105 is concatenated with the result along path 104 through XML link 110. Given the serial number provided through the cookie, this allows the concatenation to occur through firewalls and other devices which may otherwise block the transmission as unauthorized.

As the pay-per-click company 120, information is received regarding a click to website 122, but at the same time, the serial number is transmitted to the company 120 along path 130. This allows the pay-per-click company 120 to invoice the website 122 only when the serial numbers received. According to the invention, a legitimate serial number may be generated in different ways, including the first use of a different user having a unique IP address, or, if multiple requests are made by the same user, they may be considered legitimate if they are sufficiently spaced apart in time to be indicative of a legitimate as opposed to fraudulent access to the website 122.

I claim:

1. In a pay-per-click system including a search engine to list merchant websites in an order according to incremental compensation for click-through to the websites, a method for determining whether a click on a link is legitimate or fraudulent, the method comprising:

generating on a side of the search engine a code to associate with a user of the search engine who clicks on one of the merchant websites, the code uniquely identifying a device being used by the user;

returning the code to the device;

generating another code when the one of the merchant websites is clicked again by the user from the device;

concatenating the another code to the code previously generated; and determining whether the requested link to the merchant website is legitimate or fraudulent by examining a duration between two visits to the one of the merchant websites in the code.

2. The method of claim 1, wherein the code is a serial number.

3. The method of claim 1, wherein the code is stored using activeX.

4. The method of claim 1, wherein the code is stored using Java or Javascript.

5. The method of claim 1, wherein the code is stored as a cookie.

6. The method of claim 1, wherein the pay-per-click system prevents a click-though to the one of the merchant web sites if it is determined that a requested link to the one of the merchant websites is fraudulent.

7. The method of claim 1, wherein the system determines that a requested link to the one of the merchant websites is fraudulent based upon a predetermined number of requests from the user during a given period of time.

8. The method of claim 1, wherein the code includes a serial number identifying the device, and facilitates said returning the code to the device even if there is a firewall surrounding the device.

9. In a pay-per-click system including a search engine to list merchant websites in an order according to incremental compensation for click-through to the websites, the system comprising:

a device being used by a user to use the search engine;

a server hosting the search engine that generates a code to associate with the user who clicks on one of the merchant websites, the code uniquely identifying the device, and returns the code to the device, wherein the server is configured to generate another code when the one of the merchant websites is clicked again by the user from the device, and wherein the another code is concatenated to the code previously generated, and the one of the merchant websites determines whether a requested link to the merchant website is legitimate or fraudulent by examining a duration of two visits to the one of the merchant websites in the code.

10. The system of claim 9, wherein the code is a serial number.

11. The system of claim 9, wherein the code is stored using activeX.

12. The system of claim 9, wherein the code is stored using Java or Javascript.

13. The system of claim 9, wherein the code is stored as a cookie.

14. The system of claim 9, wherein the pay-per-click system prevents a click-though to the one of the merchant websites if it is determined that a requested link to the one of the merchant websites is fraudulent.

15. The system of claim 9, wherein the system determines that a requested link to the one of the merchant websites is fraudulent based upon a predetermined number of requests from the user during a given period of time.

16. The system of claim 9, wherein the code includes a serial number identifying the device, and facilitates said returning the code to the device even if there is a firewall surrounding the device.

* * * * *

UNITED STATES PATENT AND TRADEMARK OFFICE
CERTIFICATE OF CORRECTION

PATENT NO. : 7,249,104 B2
APPLICATION NO. : 10/360688
DATED : July 24, 2007
INVENTOR(S) : Patrick Zuili It is certified that error appears in the above-identified patent and that said Letters Patent is hereby corrected as shown below:

Figure 1, path 105, line 2, "activeX" should be changed to --ActiveX--.

Column 2, line 22, "active X" should be changed to --ActiveX--.

Column 3, line 8, "activeX" should be changed to --ActiveX--.

Column 4, line 14, "activeX" should be changed to --ActiveX--.

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 7,249,104 B2
APPLICATION NO. : 10/360688
DATED : July 24, 2007
INVENTOR(S) : Patrick Zuili Page 1 of 1

It is certified that error appears in the above-identified patent and that said Letters Patent is hereby corrected as shown below:

In the Specification

Column 2, line 17, replace "add words" be --Adwords--.

Column 2, line 30, replace "splash" by --flash--.

Signed and Sealed this
Seventh Day of October, 2014

Michelle K. Lee
*Deputy Director of the United States Patent and Trademark Office*